US012752904B2

(12) United States Patent
Maxey et al.

(10) Patent No.: US 12,752,904 B2
(45) Date of Patent: Oct. 6, 2026

(54) HINGE MECHANISMS FOR A DOOR OF A FUSELAGE OF AN AIRCRAFT, DOORS FOR A FUSELAGE OF AN AIRCRAFT, AIRCRAFT THAT INCLUDE THE DOORS, AND RELATED METHODS

(71) Applicant: The Boeing Company, Arlington, VA (US)

(72) Inventors: Anthony S. Maxey, Mukilteo, WA (US); Dale G. Frolander, Boise, ID (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 19/289,550

(22) Filed: Aug. 4, 2025

(65) Prior Publication Data

US 2026/0091865 A1 Apr. 2, 2026

Related U.S. Application Data

(60) Provisional application No. 63/700,933, filed on Sep. 30, 2024.

(51) Int. Cl.
*B64C 1/14* (2006.01)

(52) U.S. Cl.
CPC .......... *B64C 1/1461* (2013.01); *B64C 1/1407* (2013.01); *B64C 1/143* (2013.01)

(58) Field of Classification Search
CPC ... B64C 1/1407; B64C 1/1423; B64C 1/1461; B64C 1/143
See application file for complete search history.

(56) References Cited

U.S. PATENT DOCUMENTS 3,085,297 A * 4/1963 Linderfelt ............. B64C 1/1407 49/248
3,647,169 A * 3/1972 Allwright ............. B64C 1/1407 244/129.5
3,791,073 A * 2/1974 Baker ..................... B64C 1/143 49/40

(Continued)

FOREIGN PATENT DOCUMENTS

CN 118653750 A 9/2024
EP 0188825 A2 7/1986
EP 4717586 A1 4/2026

OTHER PUBLICATIONS

European Patent Office, Extended European Search Report issued in related application EP25186136, Sep. 4, 2025.

*Primary Examiner* — Richard G Davis
(74) *Attorney, Agent, or Firm* — Kolitch Romano Dascenzo Gates LLP

(57) ABSTRACT

Hinge mechanisms for a door of a fuselage of an aircraft, doors for a fuselage of an aircraft, aircraft that include the doors, and related methods. The hinge mechanisms include a plurality of components operatively attached to the fuselage via a body fitting. The doors include a hinge mechanism, an outer door panel, and an inner door panel and are configured to be selectively transitioned between a closed configuration, in which the door seals a door opening of the fuselage, and an open configuration, in which the door permits access to an interior of the fuselage via the door opening. The methods include methods of testing operation of the door and methods of actuating the door.

20 Claims, 11 Drawing Sheets

(56) References Cited

U.S. PATENT DOCUMENTS

| | | | | | |
|---|---|---|---|---|---|
| 4,180,943 | A * | 1/1980 | Smith | E05C 9/16 | 49/319 |
| 4,199,120 | A * | 4/1980 | Bergman | B64C 1/143 | 244/129.5 |
| 11,377,192 | B2 * | 7/2022 | Heeren | B64C 1/143 | |
| 2006/0202087 | A1 * | 9/2006 | Mortland | B64C 1/1407 | 244/129.5 |
| 2019/0300142 | A1 * | 10/2019 | Helsley | B64C 1/1407 | |

* cited by examiner

HINGE MECHANISMS FOR A DOOR OF A FUSELAGE OF AN AIRCRAFT, DOORS FOR A FUSELAGE OF AN AIRCRAFT, AIRCRAFT THAT INCLUDE THE DOORS, AND RELATED METHODS

RELATED APPLICATION

The present application is a non-provisional of and claims priority to U.S. Provisional Patent Application No. 63/700,933, filed on Sep. 30, 2024, entitled "HINGE MECHANISMS FOR A DOOR OF A FUSELAGE OF AN AIRCRAFT, DOORS FOR A FUSELAGE OF AN AIRCRAFT, AIRCRAFT THAT INCLUDE THE DOORS, AND RELATED METHODS," the complete disclosure of which is incorporated by reference.

FIELD

The present disclosure relates generally to hinge mechanisms for a door of a fuselage of an aircraft, doors for a fuselage of an aircraft, aircraft that include the doors, and related methods.

BACKGROUND

Doors may be utilized to provide and/or to restrict access to an interior of a fuselage of an aircraft. As an example, a passenger door may be utilized for passenger entry into and/or egress from the fuselage. Conventional doors for aircraft are relatively complex assemblies and include a conventional hinge mechanism that is partially contained within the conventional door itself and partially contained within a region of the fuselage that is immediately adjacent to the conventional door. Such a configuration increases an overall width of the conventional door, generally requiring approximately twice as much longitudinal space on the fuselage as the width of the conventional door opening itself and thereby precluding inclusion of a window immediately adjacent to the conventional door. In addition, conventional doors with conventional hinge assemblies are difficult to assemble, test, and/or adjust prior to installation within the aircraft fuselage, and such installation also is challenging to accomplish due to the need to align, attach, and adjust a significant number of distinct interfaces between the conventional door and the fuselage. Thus, there exists a need for improved hinge mechanisms for a door of a fuselage of an aircraft, for improved doors for a fuselage of an aircraft, for improved aircraft that include the doors, and for related methods.

SUMMARY

Hinge mechanisms for a door of a fuselage of an aircraft, doors for a fuselage of an aircraft, aircraft that include the doors, and related methods are disclosed herein. The hinge mechanisms include a plurality of components operatively attached to the fuselage via a body fitting. The doors include a hinge mechanism, an outer door panel, and an inner door panel. The hinge mechanism is configured to be selectively transitioned between a closed configuration, in which the door seals a door opening of the fuselage and the outer door panel defines an outer door panel region of an external surface of the fuselage, and an open configuration, in which the door permits access to an interior of the fuselage via the door opening and the outer door panel faces toward a corresponding region of the external surface of the fuselage. The methods include methods of testing operation of the door and methods of actuating the door.

DESCRIPTION

Figure 1:
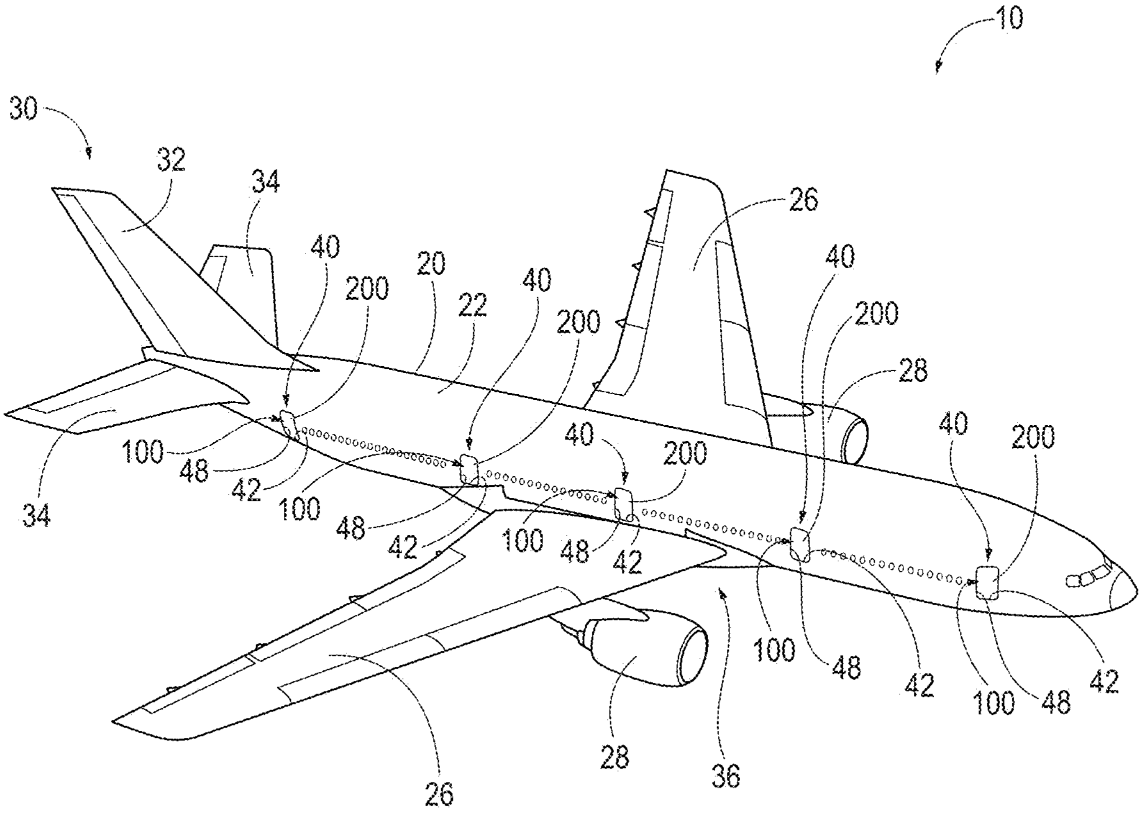
FIG. 1 is a schematic illustration of an example of an aircraft that includes a door that includes a hinge mechanism, or that may be configured to perform methods, according to the present disclosure.

FIGS. 1-11 provide illustrative, non-exclusive examples of aircraft 10, of doors 100, of hinge mechanisms 200, and/or of methods 400, according to the present disclosure. Elements that serve a similar, or at least substantially similar, purpose are labeled with like numbers in each of FIGS. 1-11, and these elements may not be discussed in detail herein with reference to each of FIGS. 1-11. Similarly, all elements may not be labeled in each of FIGS. 1-11, but reference numerals associated therewith may be utilized herein for consistency. Elements, components, and/or features that are discussed herein with reference to one or more of FIGS. 1-11 may be included in and/or utilized with any of FIGS. 1-11 without departing from the scope of the present disclosure.

In general, elements that are likely to be included in a given (i.e., a particular) embodiment are illustrated in solid lines, while elements that may be optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is a schematic illustration of an example of an aircraft 10 that includes a door 100 that includes a hinge mechanism 200, or that may be configured to perform methods 400, according to the present disclosure. Aircraft 10 includes a fuselage 20 that defines at least one door opening 40. Door opening 40 defines a door sill 42, and a corresponding door 100 is associated with each door opening 40 and includes a corresponding hinge mechanism 200. Fuselage 20 also may define an external surface 22 and an interior 24, which may be at least partially contained, surrounded by, and/or defined by the fuselage. As also illustrated in FIG. 1, aircraft 10 may include at least one wing 26, at least one engine 28, an empennage 30, a vertical stabilizer 32, at least one horizontal stabilizer 34, and/or landing gear 36.

Figure 2:
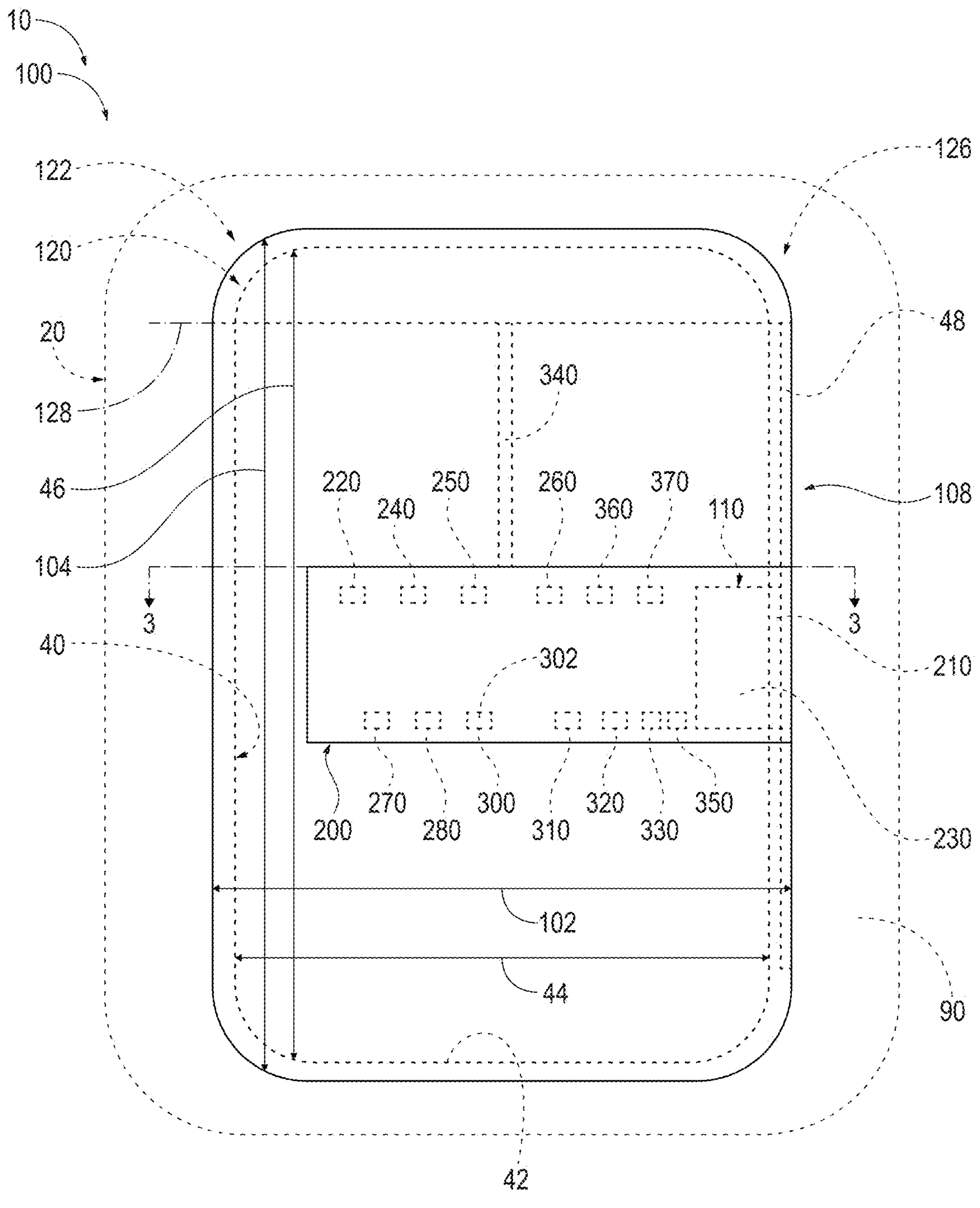
FIG. 2 is a schematic side view illustrating examples of a hinge mechanism of a door that may be included in an aircraft, according to the present disclosure.

As perhaps best illustrated in FIG. 2, fuselage 20 may include a door stop 48, which may be associated with and/or may extend into door opening 40. It is within the scope of the present disclosure that door stop 48 may include and/or be a continuous, a monolithic, and/or a unitary door stop that extends along at least a threshold fraction of a side surface of door opening 40. This is in contrast to conventional doors with conventional hinge mechanisms, where corresponding conventional door stops must be discontinuous due to the construction of the conventional hinge mechanism. Continuous door stops 48 are relatively simpler to design, implement, and/or adjust when compared to the conventional door stops. Examples of the threshold fraction of the side surface of the door opening include at least 50%, at least 60%, at least 70%, at least 80%, at least 90%, at least 95%, at least 99%, at most 100%, at most 99%, at most 95%, at most 90%, at most 80%, and/or at most 70%.

Figure 3:
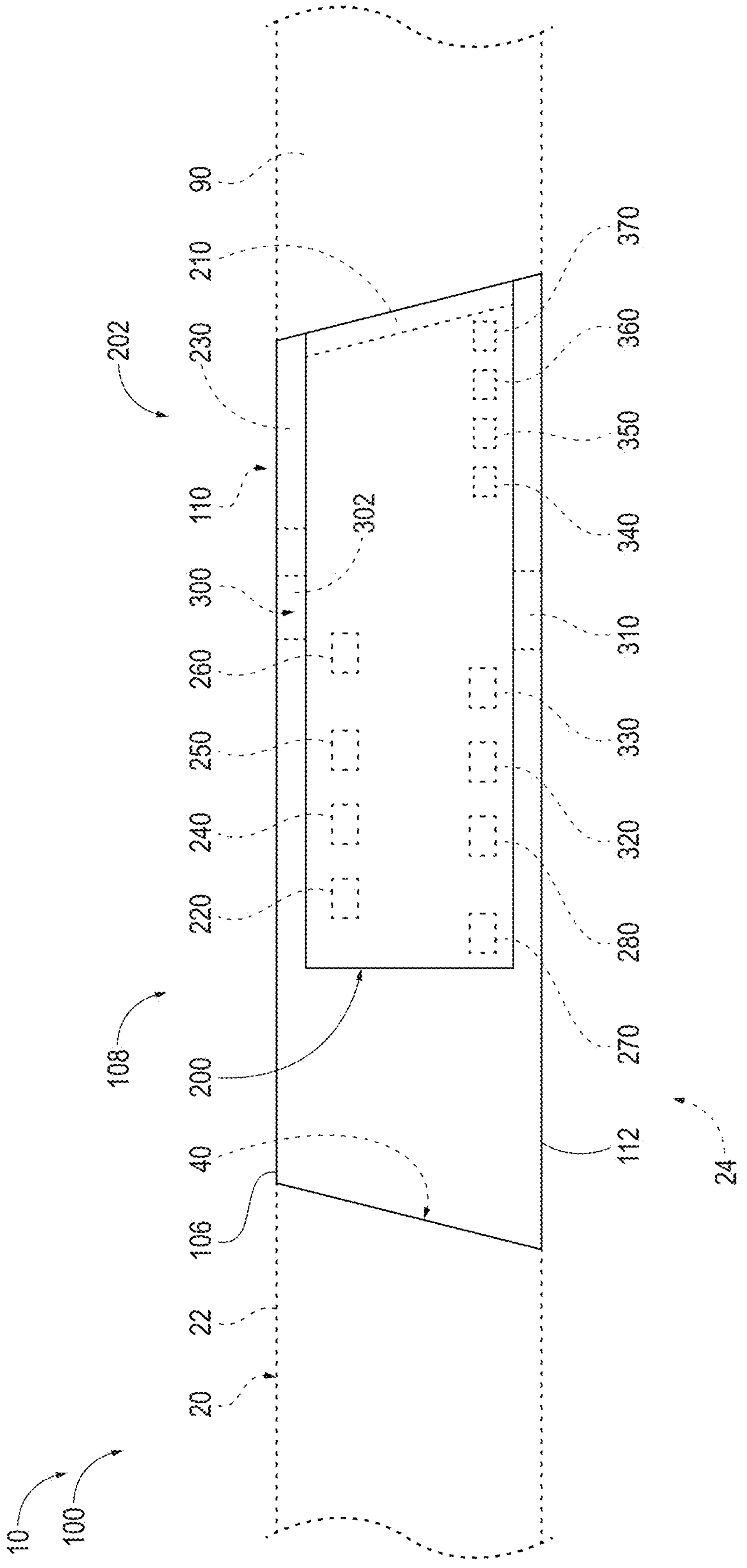
FIG. 3 is a schematic cross-sectional view of FIG. 2 taken along line 3-3 of FIG. 2.

FIG. 2 is a schematic side view illustrating examples of a hinge mechanism 200 of a door 100 that may be included in an aircraft 10, according to the present disclosure, while FIG. 3 is a schematic cross-sectional view taken along line 3-3 of FIG. 2. As collectively illustrated in FIGS. 2-3, door 100 includes hinge mechanism 200, which includes a body fitting 210 that is configured to be operatively attached to fuselage 20 of aircraft 10. Door 100 also include an outer door panel 106, which is operatively attached to hinge mechanism 200, and an inner door panel 112, which also is operatively attached to hinge mechanism 200. Hinge mechanism 200 is configured to be selectively transitioned, or to permit and/or facilitate selective transition of door 100, between a closed configuration 202, as perhaps best illustrated in FIGS. 3-4 and 7, and an open configuration 204, as perhaps best illustrated in FIG. 10. When in closed configuration 202, door 100 seals door opening 40 of fuselage 20, as perhaps best illustrated in FIGS. 4 and 7, and outer door panel 106 defines an outer door panel region 108 of external surface 22 of fuselage 20, as perhaps best illustrated in FIG. 4. When in open configuration 204, door 100 permits access to interior 24 of fuselage 20 via door opening 40, and outer door panel 106 faces toward a corresponding region of external surface 22, as perhaps best illustrated in FIG. 10.

Hinge mechanism 200 may include any suitable structure that may be adapted, configured, designed, and/or constructed to permit and/or facilitate transitioning between closed configuration 202 and open configuration 204. More specific examples of hinge mechanism 200 are discussed in more detail herein.

In some examples of doors 100, outer door panel 106 includes a body opening 110. In such examples, hinge mechanism 200 may include a hinge panel 230, which may be configured to cover body opening 110 when door 100 is in closed configuration 202, as perhaps best illustrated in FIGS. 3 and 7. Additionally or alternatively, hinge panel 230 may be configured to permit a region 206, or a different region, of hinge mechanism 200 to extend within and/or through body opening 110 when door 100 is in the open configuration 204, as perhaps best illustrated in FIG. 10. Such a configuration may permit doors 100 and/or hinge mechanisms 200 thereof to be more compact when compared to conventional doors and/or to conventional hinge mechanisms.

In some examples, doors 100 and/or hinge mechanisms 200 thereof may be configured such that, when door 100 is in open configuration 204, body fitting 210 defines the only direct physical contact between hinge mechanism 200 and fuselage 20. Additionally or alternatively, doors 100 and/or hinge mechanisms 200 may be configured such that, when doors 100 are in open configuration 204, body fitting 210 supports an entirety, or an entirety of a weight of, door 100 relative to fuselage 20. Additionally or alternatively, doors 100 and/or hinge mechanisms 200 may be configured such that, when door 100 is in closed configuration 202, an entirety of hinge mechanism 200 is positioned within door opening 40 of fuselage 20. Such a configuration may permit and/or facilitate simpler installation and/or actuation of doors 100, as is discussed in more detail herein. Additionally or alternatively, and as also discussed in more detail herein, such a configuration may permit doors 100 to utilize less longitudinal space within fuselage 20 when compared to the conventional doors. This may permit and/or facilitate installation of doors 100 in regions of fuselage 20 where longitudinal space is insufficient to permit installation of conventional doors and/or may permit windows, or additional windows, to be installed within fuselage 20 proximate doors 100 when compared to conventional doors.

Figure 5:
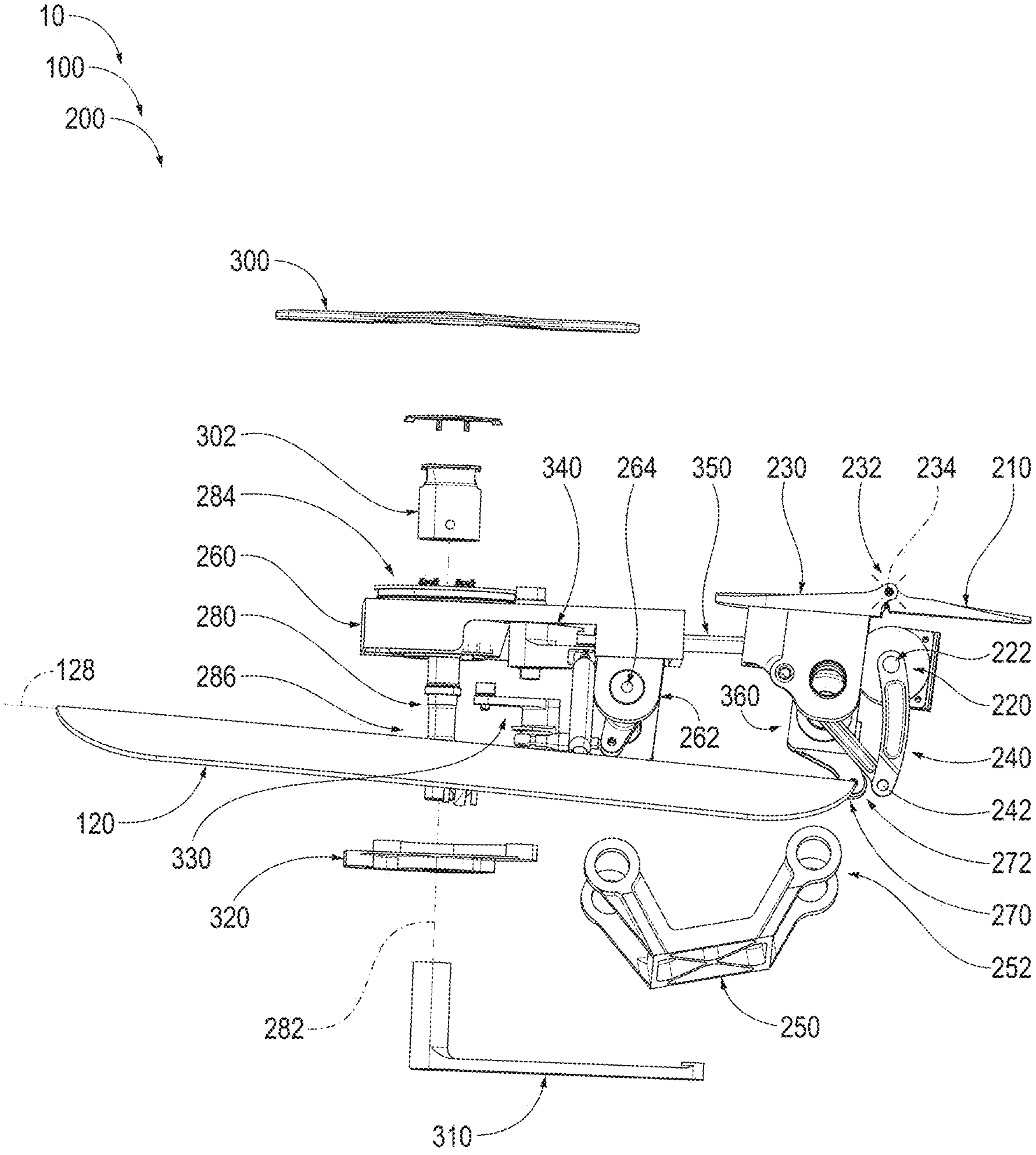
FIG. 5 is a top exploded view of the hinge mechanism of FIG. 4.
Figure 6:
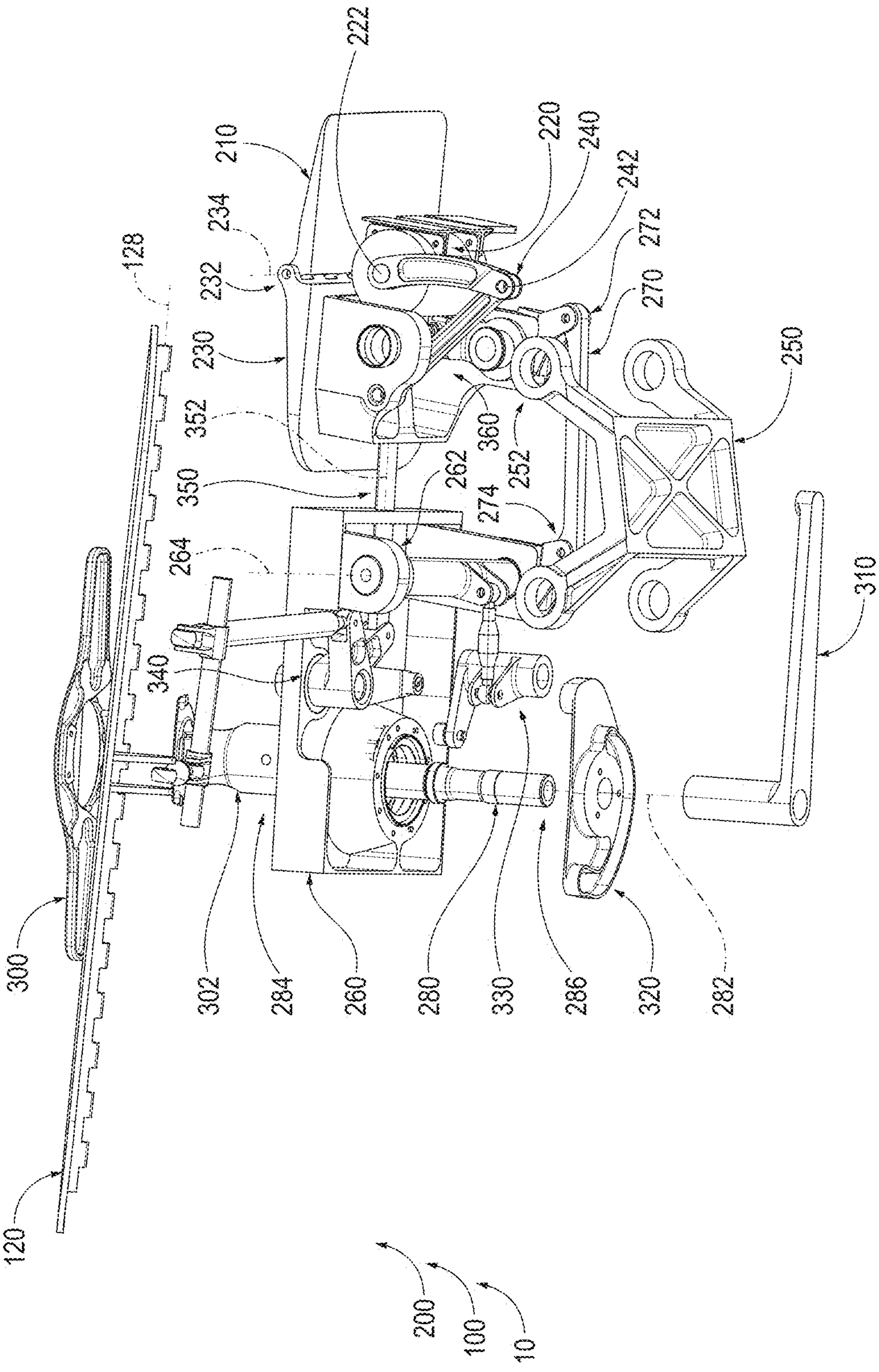
FIG. 6 is profile exploded view of the hinge mechanism of FIGS. 4-5.
Figure 7:
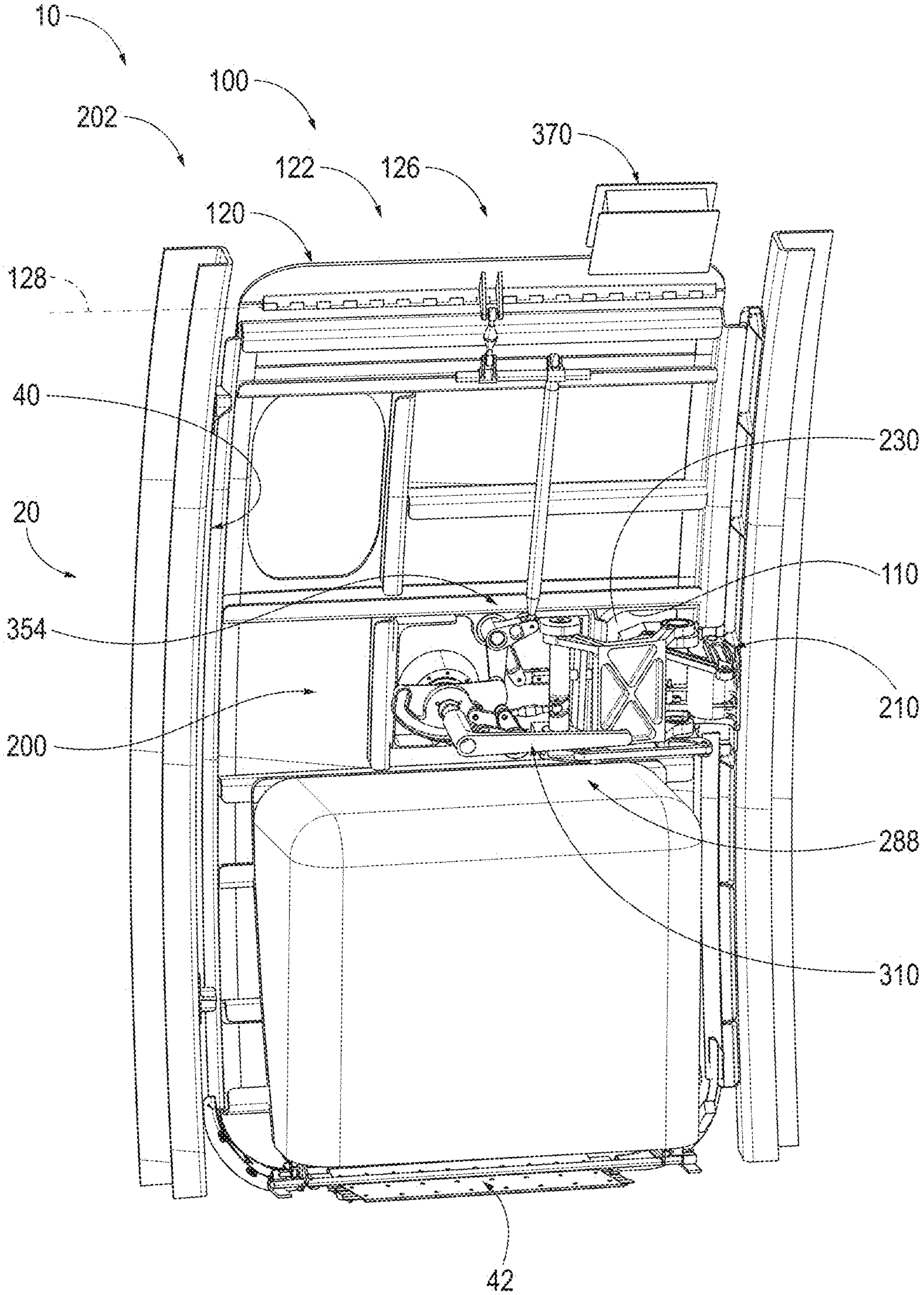
FIG. 7 illustrates a door of an aircraft, according to the present disclosure, in a closed configuration.
Figure 8:
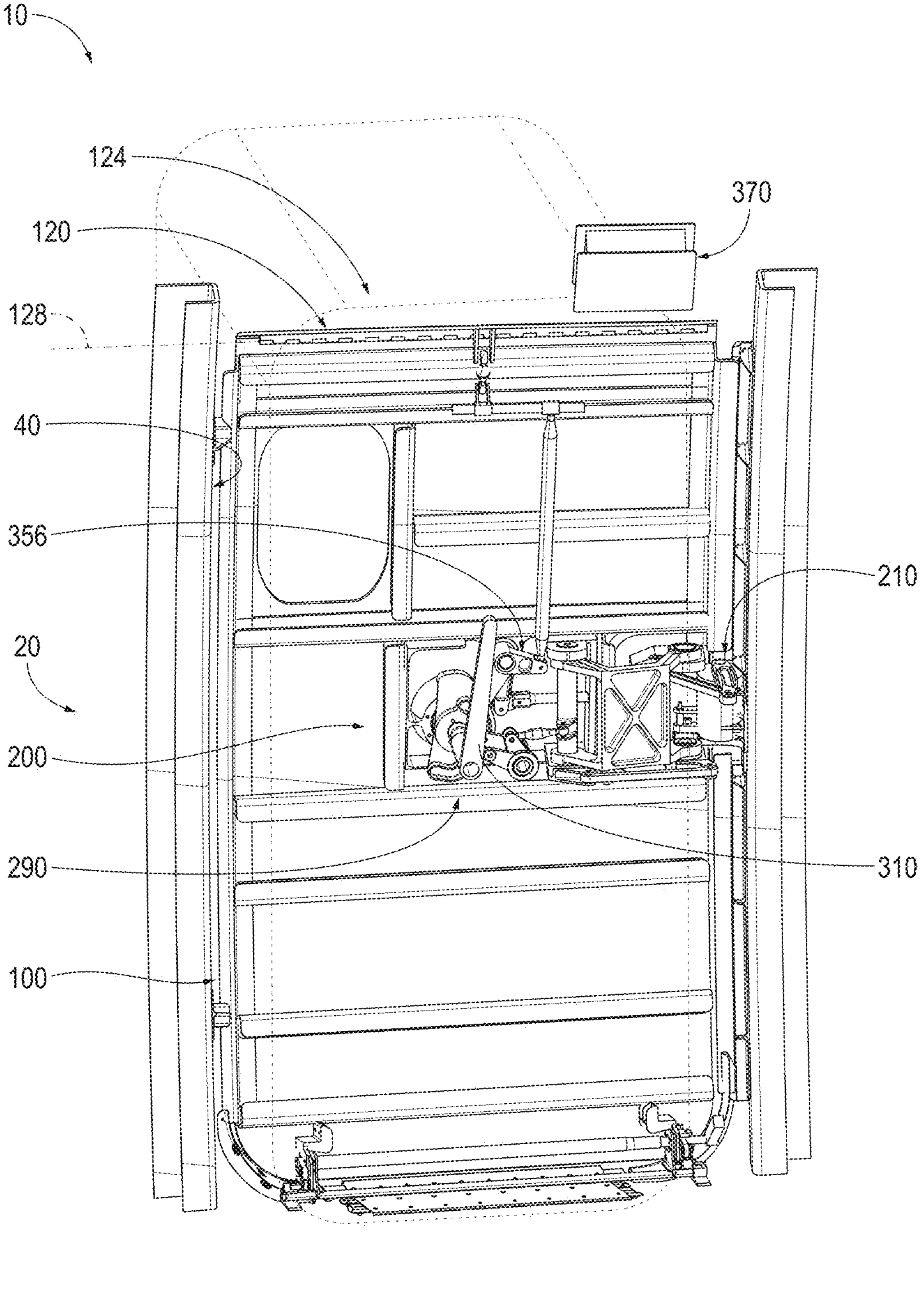
FIG. 8 illustrates the door of FIG. 7 being unlocked.

As perhaps best illustrated in FIGS. 2 and 5-9, doors 100 may include an upper gate 120. Upper gate 120, when present, may be pivotally attached to an upper region of door 100. Stated differently, upper gate 120 may be configured to pivot, or to selectively pivot, relative to a remainder of door 100, about a gate rotation axis 128, as illustrated in FIGS. 2 and 5-7. Upper gate 120 may be configured such that, when door 100 is in closed configuration 202, upper gate 120 defines an upper gate region 126 of external surface 22 of aircraft 10, as illustrated in FIGS. 2 and 7. Such a configuration may permit door 100 to fully close door opening 40. Additionally or alternatively, and when door 100 is in open configuration 204, upper gate 120 may be configured to rotate downward relative to closed configuration 202, such as about gate rotation axis 128. This is illustrated by the transition that is illustrated in FIG. 7 to the configuration that is illustrated in FIG. 8. Such a configuration may permit doors 100 to be vertically larger than door openings 40 and able still to be moved through door opening 40, as discussed in more detail herein. As discussed in more detail herein, hinge mechanism 200 may be configured to selectively rotate, or to selectively direct rotation of, upper gate 120 about gate rotation axis 128.

Figure 9:
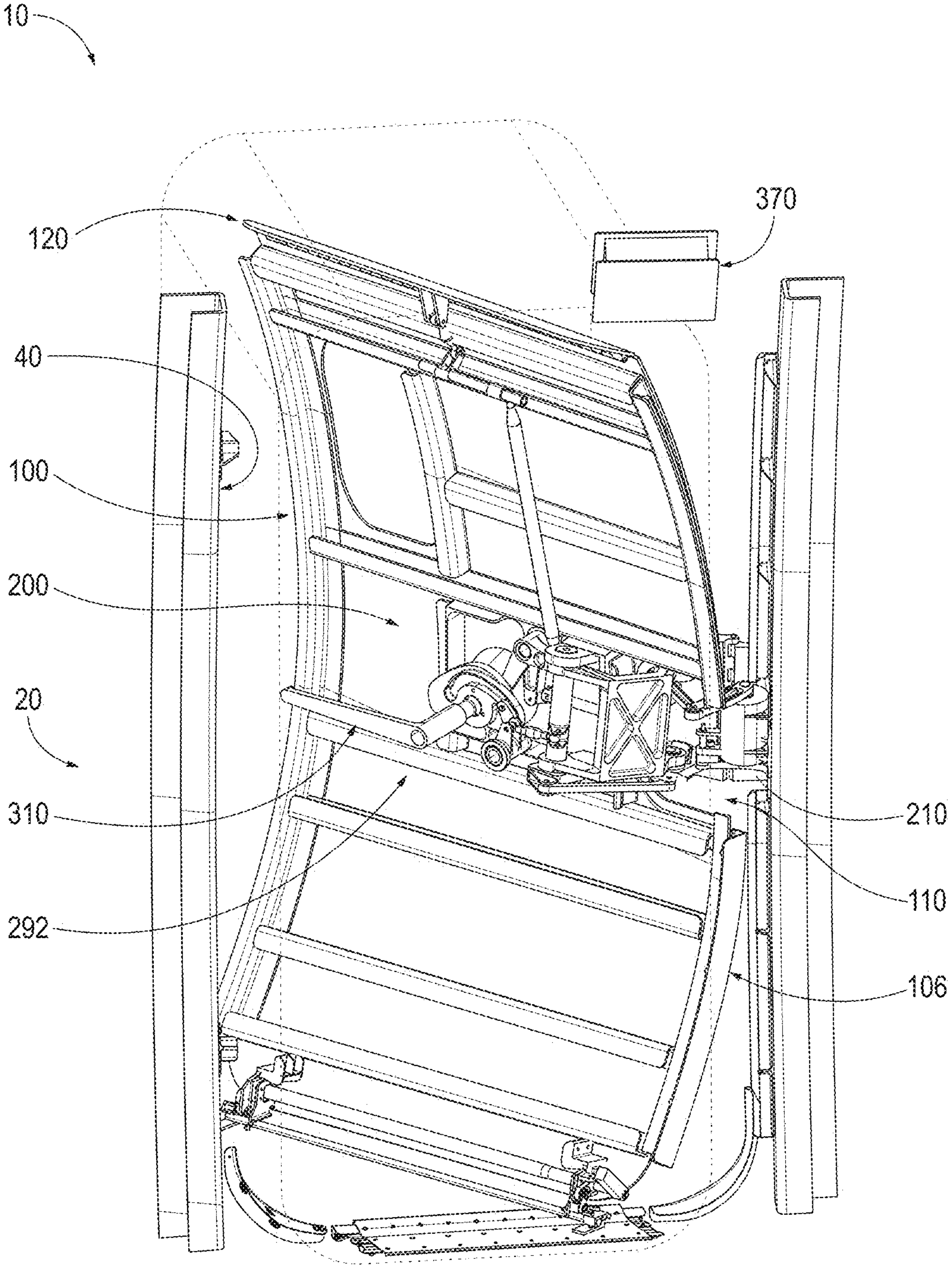
FIG. 9 illustrates the door of FIGS. 7-8 being transitioned from the closed configuration to an open configuration.

As discussed in more detail herein, hinge mechanism 200 may be configured such that, when transitioned from open configuration 204 to closed configuration 202, hinge mechanism 200 first moves door 100 from external fuselage 20 and through door opening 40. This is illustrated by the transition from the configuration that is illustrated in FIG. 9 to the configuration that is illustrated in FIG. 8. Hinge mechanism 200 subsequently moves door 100 into contact with door opening 40 from internal fuselage 20 to seal door opening 40. This is illustrated by the transition from the configuration that is illustrated in FIG. 8 to the configuration that is illustrated in FIG. 7.

As illustrated in FIG. 2, a width 102 of door 100, such as may be measured along a fore-aft line extending along a length of fuselage 20, may be greater than a width 44 of door opening 40 along the fore-aft line. Additionally or alternatively, and as illustrated in FIG. 2, a height 104 of door 100, such as may be measured perpendicular to the fore-aft line, may be greater than a height 46 of door opening 40. Such configurations may decrease a potential for doors 100 to inadvertently open and/or may require a specific series of steps and/or configurations, examples of which are disclosed herein, as doors 100 transition between open configuration 204 and closed configuration 202. In some examples, and as illustrated in FIG. 3, inner door panel 112 of doors 100 may be dimensionally larger than door opening 40 and/or may be incapable of passing through door opening 40 without first being rotated relative to door opening 40.

Figure 4:
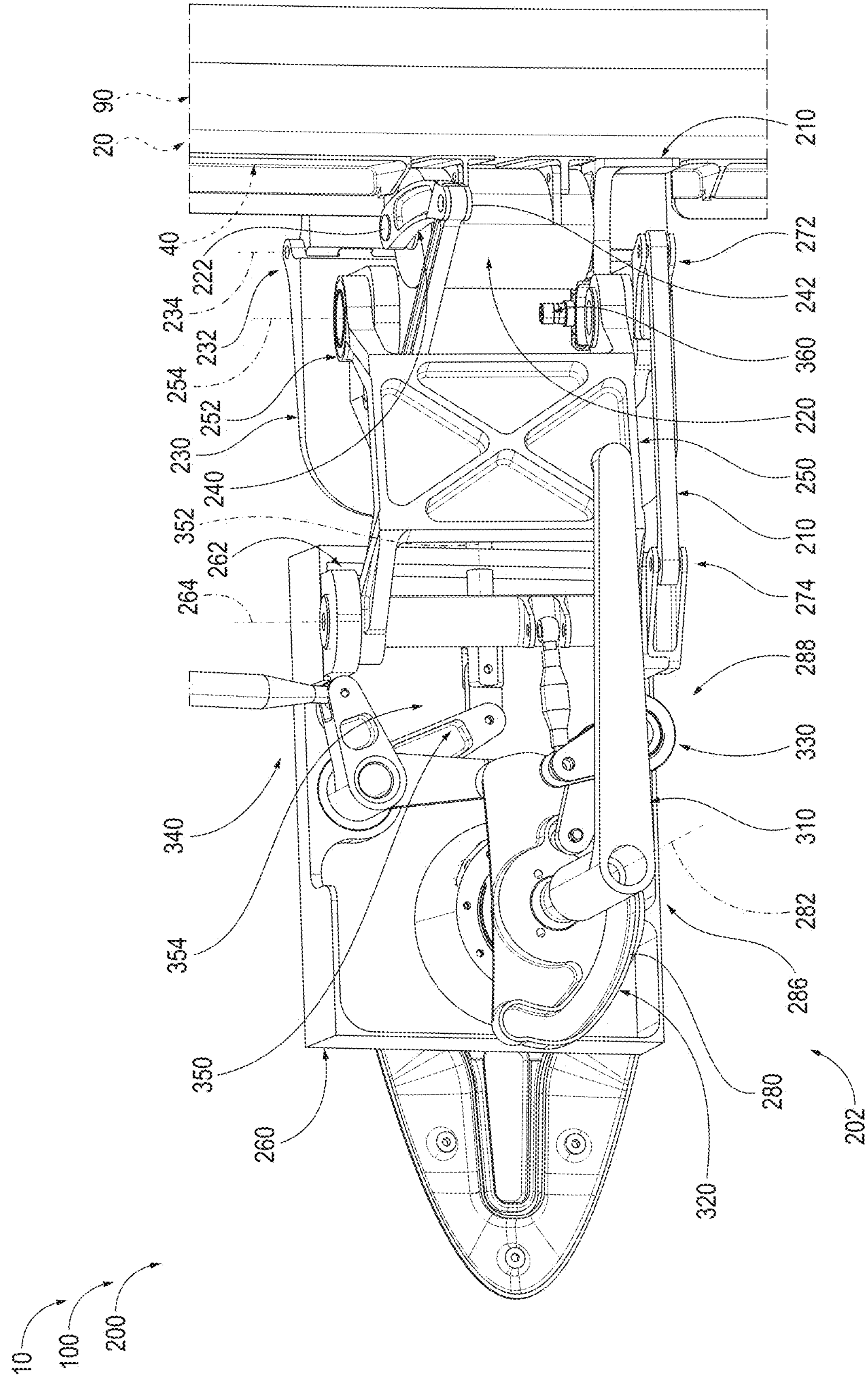
FIG. 4 is a less schematic side view illustrating an example of a hinge mechanism of a door that may be included in an aircraft, according to the present disclosure.

As discussed in more detail herein, doors 100 may be mounted to fuselage 20 via, or solely via, body fitting 210 of aircraft 10. Stated differently, body fitting 210 may define a single mounting point for doors 100, at least when doors 100 are in open configuration 204. With this in mind, and as discussed in more detail herein with reference to methods 400, doors 100 may be mounted to a vertical test support 90, as illustrated in FIGS. 2-4, prior to being installed within aircraft 10. In such a configuration, body fitting 210 may fully support door 100 relative to vertical test support 90 and/or may define the only direct physical contact between door 100 and vertical test support 90. Additionally or alternatively, body fitting 210 may define a fixed orientation relative to vertical test support 90 as door 100 transitions between open configuration 204 and closed configuration 202. Such a configuration may permit and/or facilitate relatively easier setup, alignment, and/or testing of doors 100, according to the present disclosure, when compared to conventional doors that include conventional hinge mechanisms that are operatively attached to a corresponding fuselage at a plurality of attachment locations.

Figure 10:
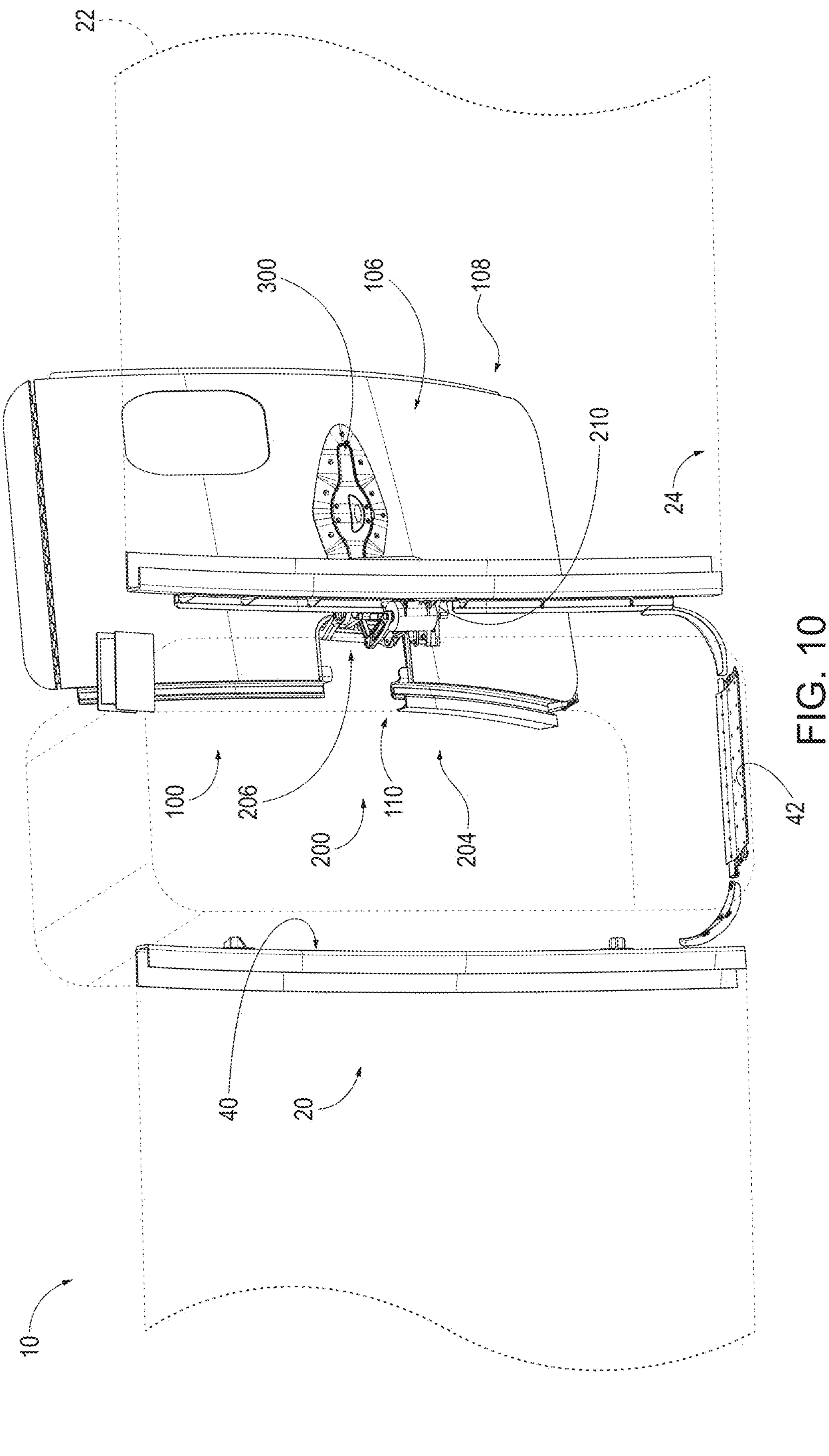
FIG. 10 illustrates the door of FIGS. 7-9 in the open configuration.

FIG. 4 is a less schematic side view illustrating an example of a hinge mechanism 200 of a door 100 that may be included in an aircraft 10, according to the present disclosure. FIG. 5 is a top exploded view of hinge mechanism 200 of FIG. 4, and FIG. 6 is profile exploded view of hinge mechanism 200 of FIGS. 4-5. FIG. 7 illustrates door 100 of aircraft 10 in closed configuration 202, and FIG. 8 illustrates door 100 of FIG. 7 being unlocked. FIG. 9 illustrates door 100 of FIGS. 7-8 being transitioned from closed configuration 202 to an open configuration 204, and FIG. 10 illustrates door 100 of FIGS. 7-9 in open configuration 204.

As collectively illustrated by FIGS. 4-10, and as discussed in more detail herein, hinge mechanism 200 may be utilized to selectively transition door 100 between closed configuration 202 and open configuration 204, examples of which are disclosed herein. Hinge mechanism 200 includes a plurality of components, examples of which include a body fitting 210, an electric motor 220, a hinge panel 230, an electric motor torque arm assembly 240, a hinge arm 250, a handle box 260, a programming arm 270, a handle shaft 280, an external handle 300, an external handle clutch 302, an internal handle 310, a handle cam 320, a drive crank 330, an upper gate drive mechanism 340, a latch pin mechanism 350, a door position sensor 360, and/or an electric energy storage device 370.

Body fitting 210 may be configured to be fixedly attached to fuselage 20 of aircraft 10. Electric motor 220 may be fixedly attached to body fitting 210. In some examples, electric motor 220 may include a motor output shaft 222, which may be configured to selectively rotate, such as may be responsive to supply of an electric current to the electric motor. Hinge panel 230 may be pivotally attached to body fitting 210, such as via a hinge-panel-to-body-fitting pivot 232 that may define a forward rotation axis 234. Hinge panel 230 may be configured to cover a body opening 110 of door 100 when door 100 is in closed configuration 202, as illustrated in FIG. 7. Additionally or alternatively, hinge panel 230 may be configured to permit a region 206 of hinge mechanism 200 to extend within body opening 110 when door 100 is in open configuration 204, as illustrated in FIG. 10.

Electric motor torque arm assembly 240 may be fixedly attached to motor output shaft 222 and/or may be pivotally attached to hinge panel 230. Electric motor torque arm assembly 240 may be configured to rotate hinge panel 230 relative to body fitting 210, such as about hinge-panel-to-body-fitting pivot 232, responsive to rotation of motor output shaft 222. In some examples, electric motor torque arm assembly 240 may include a motor output release structure 242, which may be configured to be utilized to selectively disengage motor output shaft 222 from hinge panel 230, such as to permit and/or facilitate manual rotation of hinge panel 230 relative to body fitting 210.

Hinge arm 250 may be pivotally attached to hinge panel 230, such as via a hinge-arm-to-hinge-panel pivot 252 that may define a forward hinge axis 254. Hinge-arm-to-hinge-panel pivot 252 may be spaced-apart from, may differ from, and/or may not be coaxial with hinge-panel-to-body-fitting pivot 232. Hinge arm 250 may be configured to carry a door weight of door 100 when door 100 transitions between closed configuration 202 and open configuration 204, when door 100 is in open configuration 204, and/or when door 100 is not in closed configuration 202.

Handle box 260 may be pivotally attached to hinge arm 250 via a handle-box-to-hinge-arm pivot 262 that may define an aft hinge axis 264. Aft hinge axis 264 may be spaced-apart from, may differ from, and/or may not be coaxial with hinge-arm-to-hinge-panel pivot 252.

Programming arm 270 may be pivotally attached to hinge panel 230 via a programming-arm-to-hinge-panel pivot 272, which may be spaced-apart from, may differ from, and/or may not be coaxial with hinge-arm-to-hinge-panel pivot 252. Additionally or alternatively, programming arm 270 may be pivotally attached to handle box 260 via a handle-box-to-programming-arm pivot 274, which may be spaced-apart from, may differ from, and/or may not be coaxial with handle-box-to-hinge-arm pivot 262. Programming arm 270 may be adapted, configured, sized, and/or shaped to guide motion of door 100, or relative motion between door 100 and body fitting 210, as door 100 transitions between closed configuration 202 and open configuration 204.

Handle shaft 280 may extend through handle box 260 and/or may be configured to rotate, relative to handle box 260, about a handle shaft rotational axis 282. External handle 300 may be operatively attached to an external end 284 of handle shaft 280, as perhaps best illustrated in FIG. 5. External handle 300 may be configured to be external fuselage 20 when door 100 is in closed configuration 202. Stated differently, external handle 300 may be configured to provide access to and/or actuation of hinge mechanism 200 from external aircraft 10. In some examples, external handle clutch 302 may operatively attach external handle 300 to external end 284 of handle shaft 280. In such a configuration, external handle clutch 302 may be configured to limit a torque applied to handle shaft 280 via, or via rotation of, external handle 300. Internal handle 310 may be operatively attached to an internal end 286 of handle shaft 280. Internal handle 310 may be configured to be internal fuselage 20 when door 100 is in closed configuration 202. Stated differently, internal handle 310 may be configured to provide access to and/or actuation of hinge mechanism 200 from internal aircraft 10 and/or fuselage 20 thereof.

Handle cam 320 may be operatively attached to handle shaft 280. This may include operative attachment such that handle cam 320 is configured to rotate about handle shaft rotational axis 282 responsive to rotation of handle shaft 280.

Drive crank 330 may extend between handle cam 320 and handle-box-to-hinge-arm pivot 262. In some examples, drive crank 330 may be configured to rotate, or to selectively rotate, door 100 about aft hinge axis 264 responsive to rotation of handle shaft 280.

Upper gate drive mechanism 340 may extend between handle cam 320 and upper gate 120 of door 100. In some examples, upper gate drive mechanism 340 may be configured to rotate, or to selectively rotate, upper gate 120 about gate rotational axis 128 responsive to rotation of handle shaft 280.

Latch pin mechanism 350 may extend between handle cam 320 and hinge panel 230. In some examples, latch pin mechanism 350 may be configured to translate along a latch pin translation axis 352, such as may be responsive to rotation of handle shaft 280. This may include translation along latch pin translation axis 352 to selectively translate hinge mechanism 200 between a locked configuration 354, as illustrated in FIGS. 4 and 7, and an unlocked configuration 356, as illustrated in FIG. 8. When in locked configuration 354, latch pin mechanism 350 retains door 100 in closed configuration 202 and/or resists a transition from closed configuration 202 to open configuration 204. When in unlocked configuration 256, latch pin mechanism 350 permits door 100 to transition from closed configuration 202 to open configuration 204 and/or between closed configuration 202 and open configuration 204.

Door position sensor 360 may be configured to generate a position sensor output that is indicative of a state of actuation of hinge mechanism 200. As an example, and as discussed in more detail herein, door position sensor 360 may be configured to detect when hinge mechanism 200 has been transitioned to unlocked configuration 356 and may selectively actuate electric motor 220 responsive to hinge mechanism 200 being transitioned to unlocked configuration 356.

Electrical energy storage device 370 may be configured to selectively provide electric current to electric motor 220. As an example, electrical energy storage device 370 may include and/or be a backup source of electric current and may selectively provide the electric current to electric motor 220 at least partially responsive to loss of electrical power by aircraft 10 and/or by one or more other system(s) of aircraft 10.

In some examples of hinge mechanisms 200, handle shaft 280 may define a plurality of different and/or distinct angular positions, such as may be around and/or about handle shaft rotational axis 282. These may include a locked configuration angular position 288, as illustrated in FIGS. 4 and 7, an unlocked configuration angular position 290, as illustrated in FIG. 8, and an open configuration angular position 292, as illustrated in FIG. 9. When handle shaft 280 is in locked configuration angular position 288, latch pin mechanism 350 may be in locked configuration 354. Stated differently, latch pin mechanism 350 may retain door 100 in closed configuration 202 when handle shaft 280 is in locked configuration angular position 288.

When handle shaft 280 is in unlocked configuration angular position 290, latch pin mechanism 350 may be in unlocked configuration 356. Stated differently, latch pin mechanism 350 may permit door 100 to transition between closed configuration 202 and open configuration 204 when handle shaft 280 is in unlocked configuration angular position 288. Stated still differently, transitioning handle shaft 280 from locked configuration angular position 288 to unlocked configuration angular position 290 may transition latch pin mechanism 350 from locked configuration 354 to unlocked configuration 356. Additionally or alternatively transitioning handle shaft 280 from unlocked configuration angular position 290 to locked configuration angular position 288 may transition latch pin mechanism 350 from unlocked configuration 356 to locked configuration 354.

As discussed in more detail herein, handle cam 320 may be operatively attached to handle shaft 280 and/or may be configured to operatively rotate, with handle shaft 280, about handle shaft rotational axis 282. As also discussed in more detail herein, drive crank 330, upper gate drive mechanism 340, and/or latch pin mechanism 350 may be actuated responsive to rotation of handle cam 320.

With the above in mind, and in some examples, hinge mechanisms 200 may be configured such that rotation of handle shaft 280 from locked configuration angular position 288 to unlocked configuration angular position 290 may cause actuation of one or more components that are associated with handle cam 320. As an example, and responsive to rotation of handle shaft 280 from locked configuration angular position 288 to unlocked configuration angular position 290, latch pin mechanism 350 may transition from locked configuration 354 to unlocked configuration 356 and/or handle cam 320 may act upon latch pin mechanism 350 to transition latch pin mechanism 350 from locked configuration 354 to unlocked configuration 356. This is illustrated by the transition from the configuration that is illustrated in FIG. 7 to the configuration that is illustrated in FIG. 8. Such a transition may permit and/or facilitate subsequent motion of door 100 from closed configuration 202 to open configuration 204.

As another example, and responsive to rotation of handle shaft 280 from locked configuration angular position 288 to unlocked configuration angular position 290, upper gate drive mechanism 340 may be configured to transition upper gate 120 from an upper gate closed configuration 122 to an upper gate open configuration 124 and/or handle cam 320 may act upon upper gate drive mechanism 340 to transition upper gate 120 from upper gate closed configuration 122 to upper gate open configuration 124. This also is illustrated by the transition from the configuration that is illustrated in FIG. 7 to the configuration that is illustrated in FIG. 8. Such a transition may decrease an overall vertical height of door 100, thereby permitting and/or facilitating subsequent motion of door 100 through door opening 40.

It is within the scope of the present disclosure that rotation of handle shaft 280 from locked configuration angular position 288 to unlocked configuration angular position 290 may occur without relative motion between one or more components of door 100 and fuselage 20. As an example, a relative orientation between hinge panel 230 and body fitting 210 may be unchanged during and/or responsive to rotation of handle shaft 280 from locked configuration angular position 288 to unlocked configuration angular position 290. Stated differently, door 100 may remain in and/or within door opening 40 of fuselage 20 during and/or responsive to rotation of handle shaft 280 from locked configuration angular position 288 to unlocked configuration angular position 290.

When handle shaft 280 is in open configuration angular position 292, hinge mechanism 200 may direct door 100 to open configuration 204 and/or from closed configuration 202 to open configuration 204. This may be accomplished in any suitable manner. As an example, and responsive to rotation of handle shaft 280 from unlocked configuration angular position 290 to open configuration angular position 292, door 100 may rotate inward about aft hinge axis 264, door 100 may rotate inward about forward hinge axis 254, and/or handle cam 320 may act upon drive crank 330 to cause door 100 to rotate inward about aft hinge axis 264 and/or about forward hinge axis 254. Such a configuration may decrease a width projection of door 100 relative to door opening 40, thereby permitting and/or facilitating subsequent motion of door 100 through door opening 40.

It is within the scope of the present disclosure that rotation of handle shaft 280 from unlocked configuration angular position 290 to open configuration angular position 292 also may occur without relative motion between one or more components of door 100 and fuselage 20. As an example, the relative orientation between hinge panel 230 and body fitting 210 may be unchanged during and/or responsive to rotation of handle shaft 280 from unlocked configuration angular position 290 to open configuration angular position 292.

In some examples, and responsive to rotation of door 100 inward and/or about aft hinge axis 264, door position sensor 360 may generate the position sensor output to indicated that door 100 has rotated inward about aft hinge axis 264. Additionally or alternatively, and responsive to rotation of door 100 inward, responsive to rotation of door 100 about aft hinge axis 264, and/or responsive to receipt of the position sensor output, electric motor 220 may act upon hinge panel 230, such as via electric motor torque arm assembly 240, to rotate door 100 to open configuration 204. Additionally or alternatively, and responsive to rotation of door 100 inward and/or about aft hinge axis 264, hinge panel 230 may rotate relative to body fitting 210 about forward rotation axis 234.

In some examples, and while electric motor 220 rotates door 100 to open configuration 204, a relative orientation between hinge arm 250 and handle box 260 may be unchanged. Additionally or alternatively, and while electric motor 220 rotates door 100 to open configuration 204, a relative orientation between hinge arm 250 and hinge panel 230 may be unchanged.

It is within the scope of the present disclosure that locked configuration angular position 288, unlocked configuration angular position 290, and open configuration angular position 292 may be any suitable angular position of handle shaft 280 and/or may define any suitable angular position relative to one another. As an example, unlocked configuration angular position 290 may be between locked configuration angular position 288 and open configuration angular position 292. As another example, and during rotation of handle shaft 280 from locked configuration angular position 288 to open configuration angular position 292, handle shaft 280 may transition through unlocked configuration angular position 290. As yet another example, an angular rotation of handle shaft 280 from locked configuration angular position 288 to open configuration angular position 292 may be greater than an angular rotation of handle shaft 280 from locked configuration angular position 288 to unlocked configuration angular position 290. As another example, an angular rotation of handle shaft 280 from locked configuration angular position 288 to open configuration angular position 292 may be greater than an angular rotation of the handle shaft 280 from unlocked configuration angular position 290 to open configuration angular position 292.

It is within the scope of the present disclosure that hinge mechanism 200 may be configured such that, as door 100 transitions from closed configuration 202 to open configuration 204, door 100 operatively translates upward relative to door sill 42 of door opening 40. This may include upward translation by an upward translation distance, examples of which include at least 10 centimeters (cm), at least 12 cm, at least 14 cm, at least 16 cm, at least 18 cm, at least 20 cm, at most 30 cm, at most 28 cm, at most 26 cm, at most 24 cm, at most 22 cm, and/or at most 20 cm. Such a configuration may decrease a potential for door 100 being caught on and/or contacting a jetway. With the above in mind, and when door 100 is in closed configuration 202, forward rotation axis 234, forward hinge axis 254, and/or aft hinge axis 264 may not extend perpendicular to a plane that extends within door sill 42. Additionally or alternatively, at least one of forward rotation axis 234, forward hinge axis 254, and/or aft hinge axis 264 may not be parallel to at least one other of forward rotation axis 234, forward hinge axis 254, and/or aft hinge axis 264.

Figure 11:
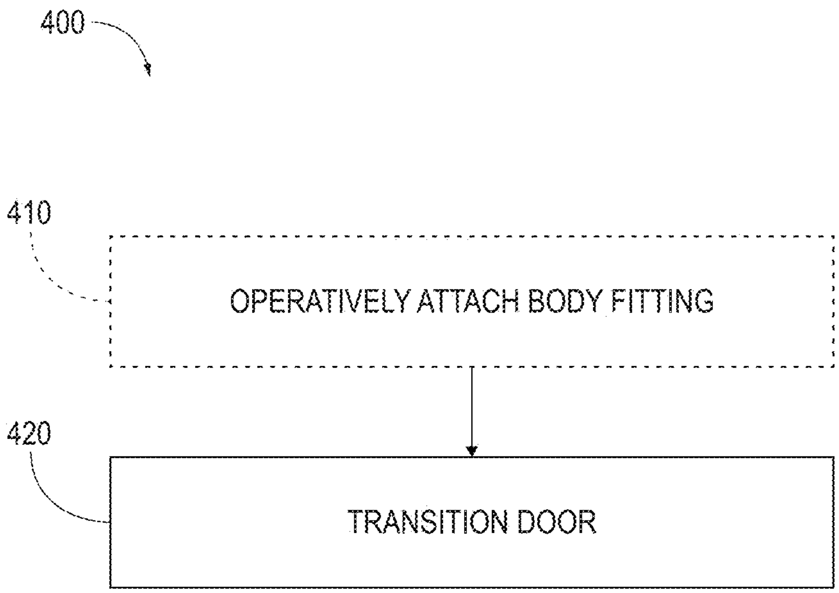
FIG. 11 is a flowchart illustrating examples of methods of testing and/or actuating a door for a fuselage of an aircraft, according to the present disclosure.

FIG. 11 is a flowchart illustrating examples of methods 400 of testing operation of and/or of actuating a door for a fuselage of an aircraft, according to the present disclosure. Methods 400 may include operatively attaching a body fitting at 410 and include transitioning a door at 420. Examples of the door and/or components thereof are disclosed herein with reference to door 100.

When methods 400 include methods of testing operation of the door, the operatively attaching at 410 may include operatively attaching the body fitting to a vertical test support. In such methods, the transitioning at 420 may include selectively transitioning the door between a closed orientation and an open orientation. Also in such methods, and during the selectively transitioning, the body fitting may define the only direct, physical contact between the door and the vertical support structure. Additionally or alternatively, and during the selectively transitioning, an entirety of the door may be supported, by the vertical test support, solely via the body fitting.

When methods 400 include methods of actuating the door, the transitioning at 420 may include transitioning the door from a closed configuration in which the door seals a door opening of a fuselage of the aircraft to an open configuration in which the door permits access to an interior of the fuselage via the door opening. In such methods, the transitioning at 400 may include covering a body opening of an outer door panel of the door with a hinge panel of a hinge mechanism of the door, supporting the door relative to the fuselage solely via a body fitting of the hinge mechanism while the door is in the open configuration, and/or positioning an entirety of the hinge mechanism within the door opening when the door is in the closed configuration.

Illustrative, non-exclusive examples of inventive subject matter according to the present disclosure are described in the following enumerated paragraphs:

A1. A hinge mechanism (200) for a door (100) of a fuselage (20) of an aircraft (10), wherein the hinge mechanism (200) is configured to be utilized to selectively transition the door (100) between a closed configuration (202) in which the door (100) seals a door opening (40) of the fuselage (20) and an open configuration (204) in which the door (100) permits access to an interior (24) of the fuselage (20) via the door opening (40), the hinge mechanism (200) comprising at least one, or one or more, of:

a body fitting (210) configured to be fixedly attached to the fuselage (20);

an electric motor (220), optionally wherein the electric motor (220) is fixedly attached to the body fitting (210), and further optionally wherein the electric motor (220) includes a motor output shaft (222) configured to selectively rotate responsive to supply of an electric current to the electric motor (220);

a hinge panel (230) pivotally attached to the body fitting (210) via a hinge-panel-to-body-fitting pivot (232) that defines a forward rotation axis (234), optionally wherein the hinge panel (230) is configured to cover a body opening (110) of the door (100) when the door (100) is in the closed configuration (202), and further optionally wherein the hinge panel (230) is configured to permit a region of the hinge mechanism (200) to extend within the body opening (110) when the door (100) is in the open configuration (204);

an electric motor torque arm assembly (240) fixedly attached to the motor output shaft (222) and pivotally attached to the hinge panel (230), optionally wherein the electric motor torque arm assembly (240) is configured to rotate the hinge panel (230) relative to the body fitting (210) and about the hinge-panel-to-body-fitting pivot (232) responsive to rotation of the motor output shaft (222), and further optionally wherein the electric motor torque arm assembly (240) includes a motor output release structure (242) configured to be utilized to selectively disengage the motor output shaft (222) from the hinge panel (230) to facilitate manual rotation of the hinge panel (230) relative to the body fitting (210);

a hinge arm (250) pivotally attached to the hinge panel (230) via a hinge-arm-to-hinge-panel pivot (252) that defines a forward hinge axis (254), optionally wherein the hinge arm (250) is configured to carry a door weight of the door (100) when the door (100) transitions between the closed configuration (202) and the open configuration (204);

a handle box (260) pivotally attached to the hinge arm (250) via a handle-box-to-hinge-arm pivot (262) that defines an aft hinge axis (264) and is spaced apart from the hinge-arm-to-hinge-panel pivot (252);

a programming arm (270) pivotally attached to the hinge panel (230) via a programming-arm-to-hinge-panel pivot (272) that is spaced-apart from the hinge-arm-to-hinge-panel pivot (252) and pivotally attached to the handle box (260) via a handle-box-to-programming-arm pivot (274) that is spaced-apart from the handle-box-to-hinge-arm pivot (262), optionally wherein the programming arm (270) is configured to guide motion of the door (100) as the door (100) transitions between the closed configuration (202) and the open configuration (204);

a handle shaft (280) that extends through the handle box (260) and is configured to rotate, relative to the handle box (260), about a handle shaft rotational axis (282);

an external handle (300) operatively attached to an external end (284) of the handle shaft (280), optionally wherein the external handle (300) is configured to be external the fuselage (20) when the door (100) is in the closed configuration (202);

an external handle clutch (302) that operatively attaches the external handle (300) to the external end of the handle shaft (280), optionally wherein the external handle clutch (302) is configured to limit a torque applied to the handle shaft (280) via the external handle (284);

an internal handle (310) operatively attached to an internal end (286) of the handle shaft (280), optionally wherein the internal handle (310) is configured to be internal the fuselage (20) when the door (100) is in the closed configuration (202);

a handle cam (320) operatively attached to the handle shaft (280) and configured to rotate about the handle shaft rotational axis (282) responsive to rotation of the handle shaft (280);

a drive crank (330) that extends between the handle cam (320) and the handle-box-to-hinge-arm pivot (262), optionally wherein the drive crank (330) is configured to rotate the door (100) about the aft hinge axis (264) responsive to rotation of the handle shaft (280);

an upper gate drive mechanism (340) that extends between the handle cam (320) and an upper gate (120) of the door (100) and is configured to rotate the upper gate (120) of the door (100) about a gate rotational axis (128) responsive to rotation of the handle shaft (280);

a latch pin mechanism (350) that extends between the handle cam (320) and the hinge panel (230), optionally wherein the latch pin mechanism (350) is configured to translate along a latch pin translational axis (352) responsive to rotation of the handle shaft (280) to selectively transition the hinge mechanism (200) between a locked configuration (354), in which the latch pin mechanism (350) retains the door (100) in the closed configuration (202), and an unlocked configuration (356), in which the latch pin mechanism (350) permits the door (100) to transition between the closed configuration (202) and the open configuration (204);

a door position sensor (360) configured to generate a position sensor output indicative of a state of actuation of the hinge mechanism (200); and an electrical energy storage device (370) configured to selectively provide the electric current to the electric motor (220).

A2. The hinge mechanism (200) of paragraph A1, wherein the handle shaft (280) defines at least one of:

(i) a locked configuration angular position (288) in which the latch pin mechanism (350) is in the locked configuration (354);

(ii) an unlocked configuration angular position (290) in which the latch pin mechanism (350) is in the unlocked configuration (356); and (iii) an open configuration angular position (292) in which the hinge mechanism (200) directs the door (100) to the open configuration (204).

A3. The hinge mechanism (200) of paragraph A2, wherein at least one of:

(i) the unlocked configuration angular position (290) is between the locked configuration angular position (288) and the open configuration angular position (292);

(ii) during rotation of the handle shaft (280) from the locked configuration angular position (288) to the open configuration angular position (292), the handle shaft (280) transitions through the unlocked configuration angular position (290);

(iii) an angular rotation of the handle shaft (280) from the locked configuration angular position (288) to the open configuration angular position (292) is greater than an angular rotation of the handle shaft (280) from the locked configuration angular position (288) to the unlocked configuration angular position (290); and (iv) an angular rotation of the handle shaft (280) from the locked configuration angular position (288) to the open configuration angular position (292) is greater than an angular rotation of the handle shaft (280) from the unlocked configuration angular position (290) to the open configuration angular position (292).

A4. The hinge mechanism (200) of any of paragraphs A2-A3, wherein, responsive to rotation of the handle shaft (280) from the locked configuration angular position (288) to the unlocked configuration angular position (290), at least one of:

(i) the latch pin mechanism (350) transitions from the locked configuration (354) to the unlocked configuration (356);

(ii) the handle cam (320) acts upon the latch pin mechanism (350) to transition the latch pin mechanism (350) from the locked configuration (354) to the unlocked configuration (356);

(iii) the upper gate drive mechanism (340) is configured to transition the upper gate (120) from an upper gate closed configuration (122) to an upper gate open configuration (124);

(iv) the handle cam (320) acts upon the upper gate drive mechanism (340) to transition the upper gate (120) from the upper gate closed configuration (122) to the upper gate open configuration (124); and (v) a relative orientation between the hinge panel (230) and the body fitting (210) is unchanged.

A5. The hinge mechanism (200) of any of paragraphs A2-A4, wherein, responsive to rotation of the handle shaft (280) from the unlocked configuration angular position (290) to the open configuration angular position (292), at least one of:

(i) the door (100) rotates inward about the aft hinge axis (264);

(ii) the handle cam (320) acts upon the drive crank (330) to cause the door (100) to rotate inward about the aft hinge axis (264);

(iii) the door (100) rotates inward about the forward hinge axis (254); and (iv) a/the relative orientation between the hinge panel (230) and the body fitting (210) is unchanged.

A6. The hinge mechanism (200) of paragraph A5, wherein, responsive to rotation of the door (100) inward about the aft hinge axis (264), at least one of:

(i) the door position sensor (360) generates the position sensor output to indicate that the door (100) has rotated inward about the aft hinge axis (264);

(ii) the electric motor (220) acts upon the hinge panel (230), via the electric motor torque arm assembly (240), to rotate the door (100) to the open configuration (204), optionally responsive to receipt of the position sensor output; and (iii) the hinge panel (230) rotates relative to the body fitting (210) about the forward rotation axis (234).

A7. The hinge mechanism (200) of paragraph A6, wherein, while the electric motor (220) rotates the door (100) to the open configuration (204), at least one of:

(i) a relative orientation between the hinge arm (250) and the handle box (260) is unchanged; and (ii) a relative orientation between the hinge arm (250) and the hinge panel (230) is unchanged.

A8. The hinge mechanism (200) of any of paragraphs A1-A7, wherein the hinge mechanism (200) is configured such that, as the door (100) transitions from the closed configuration (202) to the open configuration (204), the door (100) operatively translates upward relative to a door sill (42) of the door opening (40) by an upward translation distance.

A9. The hinge mechanism (200) of paragraph A8, wherein the upward translation distance is at least one of:

(i) at least 10 centimeters (cm), at least 12 cm, at least 14 cm, at least 16 cm, at least 18 cm, or at least 20 cm; and (ii) at most 30 cm, at most 28 cm, at most 26 cm, at most 24 cm, at most 22 cm, or at most 20 cm.

A10. The hinge mechanism (200) of any of paragraphs A8-A9, wherein, when the door (100) is in the closed configuration (202), at least one of the forward rotation axis (234), the forward hinge axis (254), and the aft hinge axis (264) is not perpendicular to a plane that extends within the door sill (42).

B1. A door (100) for a fuselage (20) of an aircraft (10), the door (100) comprising:

a hinge mechanism (200) that includes a body fitting (210) configured to be fixedly attached to the fuselage (20);

an outer door panel (106) operatively attached to the hinge mechanism (200); and an inner door panel (112) operatively attached to the hinge mechanism (200);

wherein the hinge mechanism (200) is configured to be selectively transitioned between:

(i) a closed configuration (202) in which the door (100) seals a door opening (40) of the fuselage (20) and the outer door panel (106) defines an outer door panel region (108) of an external surface (22) of the fuselage (20); and (ii) an open configuration (204) in which the door (100) permits access to an interior (24) of the fuselage (20) via the door opening (40) and the outer door panel (106) faces toward a corresponding region of the external surface (22) of the fuselage (20); and wherein at least one, or one or more, of:

(i) the hinge mechanism (200) includes any suitable structure, function and/or feature of any of the hinge mechanisms (200) of any of paragraphs A1-A10;

(ii) the outer door panel (106) includes a body opening (110) and the hinge mechanism (200) includes a hinge panel (230), wherein the hinge panel (230) is configured to cover the body opening (110) when the door (100) is in the closed configuration (202), and further wherein the hinge panel (230) is configured to permit a region of the hinge mechanism (200) to extend within the body opening (110) when the door (100) is in the open configuration (204);

(iii) when the door (100) is in the open configuration (204), the body fitting (210) defines the only direct physical contact between the hinge mechanism (200) and the fuselage (20);

(iv) when the door (100) is in the closed configuration (202), an entirety of the hinge mechanism (200) is positioned within the door opening (40) of the fuselage (20); and (v) when the door (100) is in the open configuration (204), the body fitting (210) fully supports an entirety of the door (100) relative to the fuselage (20).

B2. The door (100) of paragraph B1, wherein the door (100) further includes an upper gate (120) pivotally attached to an upper region of the door (100), wherein at least one of:

(i) when the door (100) is in the closed configuration (202), the upper gate (120) defines an upper gate region of the external surface (22) of the aircraft (10);

(ii) when the door (100) is in the open configuration (204), the upper gate (120) is rotated downward and about a gate rotation axis (128) relative to the closed configuration (202); and (iii) the hinge mechanism (200) is configured to selectively rotate the upper gate (120) about the gate rotation axis (128).

B3. The door (100) of any of paragraphs B1-B2, wherein, when transitioned from the open configuration (204) to the closed configuration (202), the hinge mechanism (200) first moves the door (100) from external the fuselage (20) through the door opening (40) of the fuselage (20) to internal the fuselage (20) and subsequently moves the door (100) into contact with the door opening (40) from internal the fuselage (20) to seal the door opening (40).

B4. The door (100) of any of paragraphs B1-B3, wherein, when in the closed configuration (202), at least one of:

(i) a width (102) of the door (100) as measured along a fore-aft line, optionally that extends along to a length of the fuselage (20), is greater than a width (44) of the door opening (40) along the fore-aft line; and (ii) a height (104) of the door (100) as measured along a line that is perpendicular to the fore-aft line is greater than a height (46) of the door opening (40) along the line that is perpendicular to the fore-aft line.

B5. The door (100) of any of paragraphs B1-B4, in combination with a vertical test support (90), wherein the body fitting (210) is operatively attached to the vertical test support (90) and defines the only direct physical contact between the door (100) and the vertical test support (90), and further wherein the body fitting (210) defines a fixed orientation relative to the vertical test support (90) as the door (100) transitions between the open configuration (204) and the closed configuration (202).

C1. An aircraft (10), comprising:

a fuselage (20) that defines a door opening (40); and the door (100) of any of paragraphs B1-B5.

C2. The aircraft (10) of paragraph C1, wherein the aircraft (10) further includes at least one of:

(i) a wing (26);

(ii) an engine (28);

(iii) an empennage (30);

(iv) a vertical stabilizer (32);

(v) a horizontal stabilizer (34); and (vi) a landing gear (36).

C3. The aircraft (10) of any of paragraphs C1-C2, wherein the fuselage (20) further includes a continuous, monolithic, or unitary door stop (48) that extends along at least a threshold fraction of a side surface of the door opening (40), optionally wherein the threshold fraction of the side surface of the door opening (40) is at least one of:

(i) at least 50%, at least 60%, at least 70%, at least 80%, at least 90%, at least 95%, or at least 99%; and (ii) at most 100%, at most 99%, at most 95%, at most 90%, at most 80%, or at most 70%.

D1. A method (400) of testing operation of a door (100) for a fuselage (20) of an aircraft (10), the method (400) comprising:

operatively attaching (410) a body fitting (210) of the door (100) to a vertical test support (90); and selectively transitioning (420) the door (100) between a closed configuration (202) and an open configuration (204), wherein, during the selectively transitioning (420), at least one of:

(i) the body fitting (210) defines the only direct, physical contact between the door (100) and the vertical test support (90); and (ii) an entirety of the door (100) is supported, by the vertical test support (90), solely via the body fitting (210).

D2. The method (400) of paragraph D1, wherein the door (100) includes any suitable structure, function, and/or feature of any of the doors (100) of any of paragraphs B1-B5.

E1. A method of actuating a door (100) of an aircraft (10), the method comprising:

transitioning (420) the door (100) from an open configuration (204), in which the door (100) permits access to an interior (24) of the fuselage (20) via the door opening (40), to a closed configuration (202), in which the door (100) seals a door opening (40) of a fuselage (20) of the aircraft (10); wherein the transitioning (420) includes at least one, or one or more, of:

(i) covering a body opening (110) of an outer door panel (106) of the door (100) with a hinge panel (230) of a hinge mechanism (200) of the door (100);

(ii) withdrawing a region of the hinge mechanism (200) from the body opening (110);

(iii) supporting the door (100) relative to the fuselage (20) solely via a body fitting (210) of the hinge mechanism (200) while the door (100) is in the open configuration (204); and (iv) positioning an entirety of the hinge mechanism (200) within the door opening (40) when the door (100) is in the closed configuration (202).

E2. The method of paragraph E1, wherein the aircraft (10) includes any suitable structure, function, and/or feature of any of the aircraft (10) of any of paragraphs C1-C3.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A door for a fuselage of an aircraft, the door comprising:

a hinge mechanism that includes a body fitting configured to be fixedly attached to the fuselage;

an outer door panel operatively attached to the hinge mechanism; and an inner door panel operatively attached to the hinge mechanism;

wherein the hinge mechanism is configured to be selectively transitioned between:

(i) a closed configuration in which the door seals a door opening of the fuselage and the outer door panel defines an outer door panel region of an external surface of the fuselage; and (ii) an open configuration in which the door permits access to an interior of the fuselage via the door opening and the outer door panel faces toward a corresponding region of the external surface of the fuselage; and wherein when the door is in the open configuration, the body fitting fully supports an entirety of the door relative to the fuselage;

wherein the outer door panel includes a body opening and the hinge mechanism includes a hinge panel:

wherein the hinge panel is configured to cover the body opening when the door is in the closed configuration;

wherein the hinge panel is configured to permit a region of the hinge mechanism to extend within the door opening when the door is in the open configuration;

wherein the hinge mechanism further includes:

(i) an electric motor that includes a motor output shaft configured to selectively rotate responsive to supply of an electric current to the electric motor; and (ii) an electric motor torque arm assembly fixedly attached to the motor output shaft and pivotally attached to the hinge panel, wherein the electric motor torque arm assembly is configured to rotate the hinge panel relative to the body fitting and about a hinge-panel-to-body-fitting pivot responsive to rotation of the motor output shaft.

2. The door of claim 1, wherein the door further includes an upper gate pivotally attached to an upper region of the door, wherein:

(i) when the door is in the closed configuration, the upper gate defines an upper gate region of the external surface of the aircraft;

(ii) when the door is in the open configuration, the upper gate is rotated downward and about a gate rotation axis relative to the closed configuration; and (iii) the hinge mechanism is configured to selectively rotate the upper gate about the gate rotation axis.

3. The door of claim 1, wherein, when the door is in the closed configuration, an entirety of the hinge mechanism is positioned within the door opening of the fuselage.

4. The door of claim 1, wherein the hinge panel is pivotally attached to the body fitting via a hinge-panel-to-body-fitting pivot that defines a forward rotation axis.

5. The door of claim 4, wherein the hinge mechanism further includes a hinge arm pivotally attached to the hinge panel via a hinge-arm-to-hinge-panel pivot that defines a forward hinge axis.

6. The door of claim 5, wherein the hinge mechanism further includes a handle box pivotally attached to the hinge arm via a handle-box-to-hinge-arm pivot that defines an aft hinge axis and is spaced apart from the hinge-arm-to-hinge-panel pivot.

7. The door of claim 6, wherein the hinge mechanism further includes:

a handle shaft that extends through the handle box and is configured to rotate, relative to the handle box, about a handle shaft rotational axis;

an external handle operatively attached to an external end of the handle shaft, wherein the external handle is configured to be external the fuselage when the door is in the closed configuration; and an internal handle operatively attached to an internal end of the handle shaft, wherein the internal handle is configured to be internal the fuselage when the door is in the closed configuration.

8. The door of claim 7, wherein the hinge mechanism further includes a handle cam operatively attached to the handle shaft and configured to rotate about the handle shaft rotational axis responsive to rotation of the handle shaft.

9. The door of claim 8, wherein the hinge mechanism further includes a drive crank that extends between the handle cam and the handle-box-to-hinge-arm pivot, wherein the drive crank is configured to rotate the door about the aft hinge axis responsive to rotation of the handle shaft.

10. The door of claim 8, wherein the hinge mechanism further includes an upper gate drive mechanism that extends between the handle cam and an upper gate of the door and is configured to rotate the upper gate of the door about a gate rotational axis responsive to rotation of the handle shaft.

11. The door of claim 8, wherein the hinge mechanism further includes a latch pin mechanism that extends between the handle cam and the hinge panel, wherein the latch pin mechanism is configured to translate along a latch pin translational axis responsive to rotation of the handle shaft to selectively transition the hinge mechanism between a locked configuration, in which the latch pin retains the door in the closed configuration, and an unlocked configuration, in which the latch pin permits the door to transition between the closed configuration and the open configuration.

12. The door of claim 11, wherein the handle shaft defines:

(i) a locked configuration angular position in which the latch pin mechanism is in the locked configuration;

(ii) an unlocked configuration angular position in which the latch pin mechanism is in the unlocked configuration; and (iii) an open configuration angular position in which the hinge mechanism directs the door to the open configuration.

13. The door of claim 12, wherein at least one of:

(i) the unlocked configuration angular position is between the locked configuration angular position and the open configuration angular position;

(ii) during rotation of the handle shaft from the locked configuration angular position to the open configuration angular position, the handle shaft transitions through the unlocked configuration angular position;

(iii) an angular rotation of the handle shaft from the locked configuration angular position to the open configuration angular position is greater than an angular rotation of the handle shaft from the locked configuration angular position to the unlocked configuration angular position; and (iv) an angular rotation of the handle shaft from the locked configuration angular position to the open configuration angular position is greater than an angular rotation of the handle shaft from the unlocked configuration angular position to the open configuration angular position.

14. The door of claim 12, wherein, responsive to rotation of the handle shaft from the locked configuration angular position to the unlocked configuration angular position, the handle cam acts upon the latch pin mechanism to transition the latch pin mechanism from the locked configuration to the unlocked configuration, and the handle cam acts upon an upper gate drive mechanism to transition an upper gate from an upper gate closed configuration to an upper gate open configuration, while a relative orientation between the hinge panel and the body fitting is unchanged.

15. The door of claim 12, wherein, responsive to rotation of the handle shaft from the unlocked configuration angular position to the open configuration angular position, the handle cam acts upon a drive crank to cause the door to rotate inward about the aft hinge axis and a relative orientation between the hinge panel and the body fitting is unchanged.

16. The door of claim 15, wherein, responsive to rotation of the door inward about the aft hinge axis, an electric motor acts upon the hinge panel, via an electric motor torque arm, to rotate the door to the open configuration.

17. A method of actuating the door of claim 1, the method comprising:

transitioning the door from the open configuration to the closed configuration;

wherein the transitioning includes at least one of:

(i) covering the body opening of an outer door panel of the door with the hinge panel of the hinge mechanism of the door;

(ii) withdrawing the region of the hinge mechanism from the body opening;

(iii) supporting the door relative to the fuselage solely via the body fitting of the hinge mechanism while the door is in the open configuration; and (iv) positioning an entirety of the hinge mechanism within the door opening when the door is in the closed configuration.

18. A method of testing operation of the door of claim 1, the method comprising:

operatively attaching the body fitting of the door to a vertical test support; and selectively transitioning the door between the closed configuration and the open configuration;

wherein, during the selectively transitioning, the body fitting defines the only direct, physical contact between the door and the vertical test support.

19. An aircraft, comprising:

a fuselage that defines a door opening; and the door of claim 1.

20. A method of testing operation of the door of claim 1, the method comprising:

operatively attaching the body fitting of the door to a vertical test support; and selectively transitioning the door between the closed configuration and the open configuration;

wherein, during the selectively transitioning, the entirety of the door is supported, by the vertical test support, solely via the body fitting.

* * * * *